G. W. BORG.
FRICTION CLUTCH.
APPLICATION FILED MAR. 24, 1913.

1,131,769.

Patented Mar. 16, 1915.

2 SHEETS—SHEET 2.

Witnesses:

Inventor:
George W. Borg

UNITED STATES PATENT OFFICE.

GEORGE W. BORG, OF ROCK ISLAND, ILLINOIS, ASSIGNOR TO THE BORG & BECK COMPANY, OF MOLINE, ILLINOIS, A CORPORATION OF ILLINOIS.

FRICTION-CLUTCH.

1,131,769.  Specification of Letters Patent.  Patented Mar. 16, 1915.

Application filed March 24, 1913. Serial No. 756,496.

*To all whom it may concern:*

Be it known that I, GEORGE W. BORG, a citizen of the United States, residing in Rock Island, in the county of Rock Island and State of Illinois, have invented certain new and useful Improvements in Friction-Clutches, of which the following is a specification.

This invention relates to friction clutches and has for its object broadly to provide an adjustment or take-up device in a friction clutch which will permit the wearing surfaces of the clutch to be adjusted relatively to each other desired amounts without affecting the efficiency of the clutch or the action of its relatively moving parts.

A further object of the invention is to provide an adjustment or take-up device in a friction clutch which may readily be operated without requiring that any of the parts of the clutch be removed.

Additional objects and advantages of the invention will be apparent as it is better understood from the following description taken in connection with the accompanying drawings illustrating preferred embodiments thereof.

Figure 1:
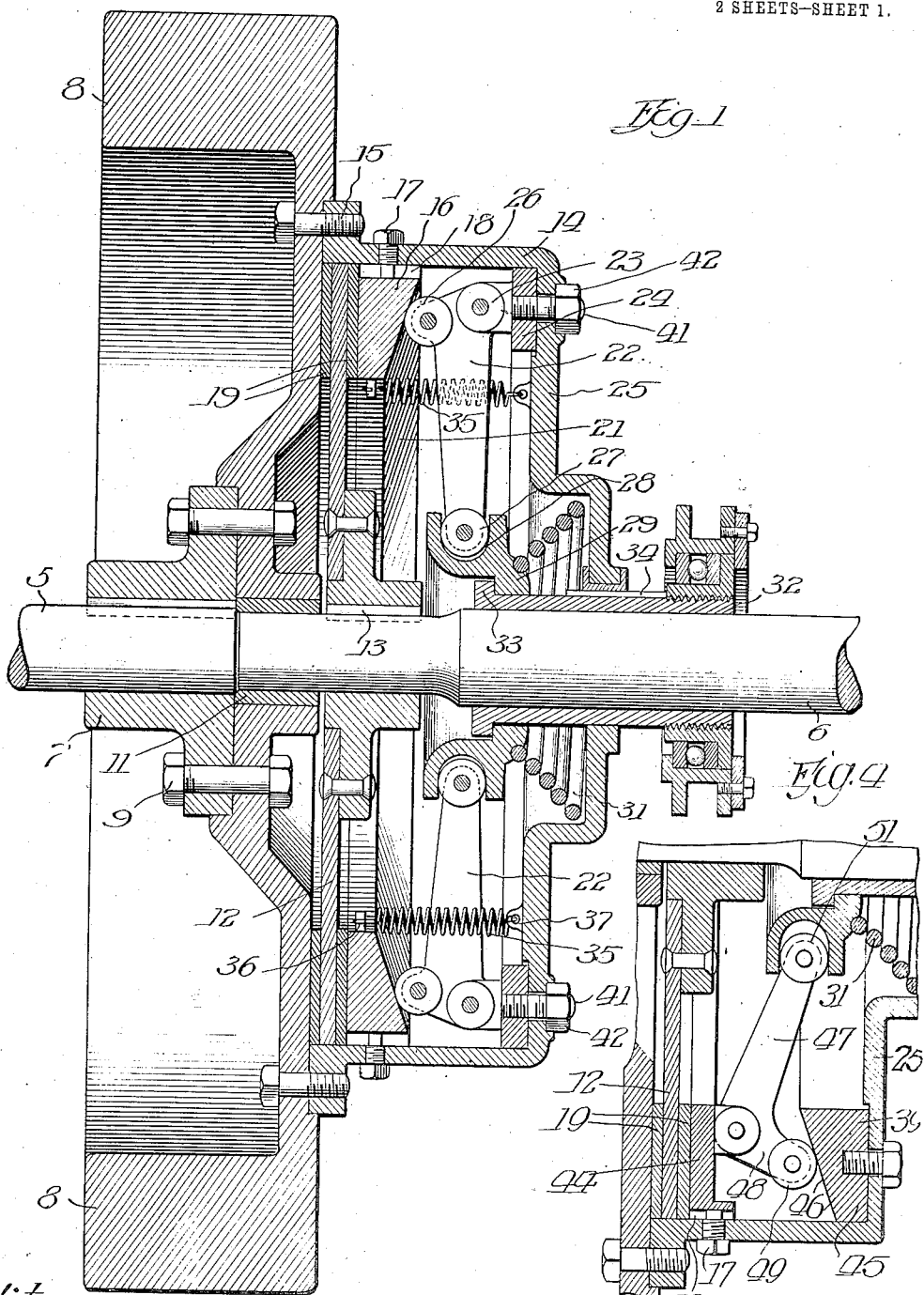
Figure 2:
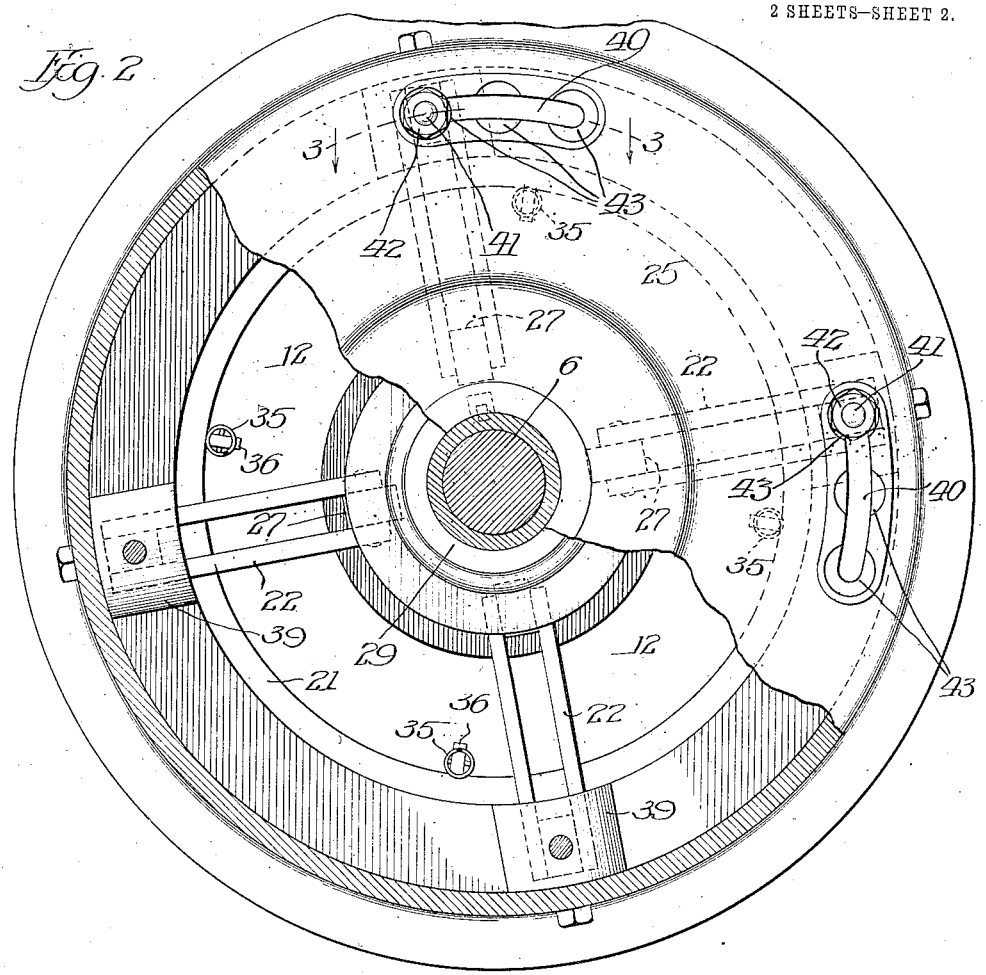
Figure 3:
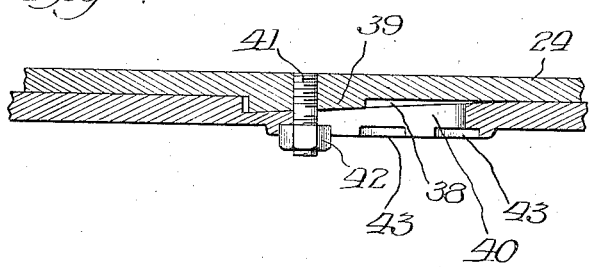

On the drawings: Figure 1 is a longitudinal sectional view of a clutch embodying my invention; Fig. 2 is an end elevation of the same with a portion of the rear wall of the casing broken away; Fig. 3 is an enlarged detail sectional view on the line 3—3 of Fig. 2, and Fig. 4 is a fragmentary sectional view showing a modified form of the clutch shown in Figs. 1-3.

Referring to the drawings, 5 designates the driving shaft and 6 the driven shaft. Upon a collar 7 keyed to the driving shaft 5 is rigidly fastened a fly-wheel 8 by means of suitable bolts, rivets or other fastening means 9, so that the fly-wheel, collar and shaft rotate as a single unit and together may be termed the driving element. The driven shaft 6 is journaled at its end in a pilot bearing 11 at the center of the fly-wheel. Upon the shaft 6 and movable longitudinally thereof is mounted a friction disk 12. The disk 12 is caused to rotate continuously with the shaft 6 by a spline 13 fastened in the shaft and taking into a suitable groove in the disk.

A clutch casing 14 is secured to the fly-wheel by suitable fastening means 15 and incloses the disk 12. A thrust ring 16 is mounted within the casing 14 to move longitudinally thereof and is held against rotation relatively to the casing and the fly-wheel by means of driving pins 17 extending through the casing and taking into transverse slots 18 in the periphery of the thrust ring. A pair of friction rings 19 are provided, one between the adjacent faces of the fly-wheel and the friction disk 12 and the other between the adjacent faces of the friction disk 12 and the thrust ring 16. The face 21 of the thrust ring distant from the fly-wheel is beveled or inclined from the inner edge of the ring toward the casing to form an inclined thrust seat to receive the thrust from a plurality of bell cranks 22 which are provided to move the thrust ring toward the fly-wheel to throw in the clutch.

The bell cranks 22 are pivotally mounted in lugs 23 carried by the ring 24 positioned against the rear wall 25 of the casing. The ends of the arms of each of these bell cranks are preferably but not necessarily provided with rollers 26 and 27, the roller 26 of the short arm being adapted to engage and travel over the beveled face or seat 21 of the thrust ring 16. The roller 27 is positioned in a suitable groove 28 of a collar 29 which is pressed toward the left, viewing Fig. 1, away from the rear wall 25 of the casing by a spiral spring 31. The collar 29 is mounted upon a clutch throw-out sleeve 32 at the end of which within the casing is provided an outwardly extending flange 33 which is adapted to engage the collar 29 when the sleeve is moved against the force of the spring 31 toward the right, viewing Fig. 1, by any suitable mechanism to throw out the clutch. This sleeve is caused to rotate with the casing and with the driving element by a spline 34 slidably connecting it to the rear wall of the casing. A plurality of springs 35, each fastened at one end to a lug 36 provided upon the thrust ring and at the other end to a lug 37 provided upon the rear wall of the casing, pull the thrust ring toward the said rear wall and cause it to follow the rollers 26 when the bell cranks are moved to throw out the clutch and break immediately the frictional engagement between the thrust ring and the friction disk. A ring 24 upon which the bell cranks are pivoted is connected to the rear wall of the casing and is adapted to be moved inwardly of the casing as the friction rings wear in service to re-adjust the parts of the clutch as will now be described. In the inner face of the rear wall of the casing are provided a plurality of angularly disposed elongated recesses 38 having an inclined base extending from end to end, and projecting outwardly from the adjacent face of the ring 24 are provided a plurality of shoulders or bearing studs 39, having their outer faces correspondingly inclined to permit them to engage and slide over the inclined bases of the recesses 38, as seen in Fig. 3. The inclined faces of the shoulders and the bases of the recesses are held in fixed contact by a plurality of bolts 41 fastened at their inner ends in the ring and extending through arcuate slots 40 in the rear wall of the casing and preferably behind the recesses 38. Nuts 42 are provided upon the ends of the bolts and are adapted to be screwed down against the outer face of the rear wall of the casing to hold the ring in adjusted relation relatively to said rear wall.

When the friction rings 19 are new, the studs or shoulders 39 are disposed at the deeper ends of the recesses 38. As the friction rings 19 wear away so that the action of the bell cranks upon the thrust ring does not produce a sufficiently firm frictional engagement between the driving and driven elements, the nuts 42 may be loosened and pushed about the central axis of the casing to slide the inclined face of the stud up the inclined base of the recess to decrease the distance between the ring 24 and the flywheel until the bell cranks are again in position to change the travel of the thrust ring longitudinally of the casing and permit it, when the clutch is thrown in, to hold the transmission parts in efficient frictional engagement. To prevent the movement of the casing and the other parts of the clutch from returning the shoulder 39 to the lower end of the recess 38, I provide a plurality of recesses 43 in the outer face of the rear wall into which the nuts may seat after the ring has been adjusted. In the present instance three such recesses are provided for each groove, one at each end of the groove and the other intermediate its ends, so that the ring may be held in three adjusted positions.

In Fig. 4 is shown a second embodiment of my invention in which the positions of the yoke ring 44 and the thrust ring 45 have been interchanged and the parts of the clutch reconstructed accordingly. The thrust ring is provided with a beveled thrust seat 46 for the bell cranks 47 upon its face away from the rear wall of the casing, and this seat is inclined from the outer edge of the ring toward the inner edge. In the present instance, the short arms 48 of the bell cranks 47 engage the thrust seat 46 adjacent its outer edge, and as in the embodiment previously described, rollers 49 and 51 may be provided upon the arms of the bell cranks. Shoulders 39 are provided upon the thrust ring instead of upon the yoke ring, as previously described, and rest in the recesses 38 in contact with their inclined bases, and slots 52 are provided in the yoke ring to receive the driving pins 17 and cause the yoke ring to rotate with the casing. The operations of the clutch and of the adjustment device are identical with those already described in connection with the embodiment of the invention shown in Figs. 1 to 3.

It will be apparent that as the bell cranks thrust directly against the thrust seats and have no fixed connection therewith or with the throw-out sleeve, they will act with equal efficiency in all of the adjusted positions, and that as the nuts, which are the only parts which must be manipulated in adjusting the clutch, are located without the casing no parts of the clutch need be removed to perform this operation.

It is thought that the invention and many of its attendant advantages will be understood from the foregoing without further description and it will be obvious that numerous changes may be made in the form, construction and arrangement of the parts without departing from the spirit and scope of the invention or sacrificing any of its advantages, the forms hereinbefore disclosed being merely preferred embodiments thereof.

I claim:

1. In a friction clutch, the combination of a driving element, a driven element, a casing fixed to one element and embracing the other element, a thrust member mounted within and rotatable with said casing, means positioned between said thrust member and the rear wall of the casing for moving said thrust member longitudinally of the casing to establish frictional engagement between said elements, means slidably engaging the rear wall of the casing to move said moving means longitudinally of said elements to adjust for wear of the parts of the clutch, and means for adjusting said slidably engaging means.

2. In a friction clutch, the combination of a driving element, a driven element, a casing fixed to one element and embracing the other element, a thrust member mounted within and rotatable with said casing, means for moving said thrust member longitudinally of the casing to establish frictional engagement between said elements interposed between said thrust member and the rear wall of the casing, means interposed between said moving means and said rear wall to cause said moving means to move longitudinally of said elements upon angular movement of said moving means relatively to said casing, and means for moving said moving means angularly with respect to the casing to adjust for wear of the parts of the clutch.

3. In a friction clutch, the combination of a driving element, a driven element, a casing fixed to one element and embracing the other element, a thrust member mounted within and rotatable with said casing and having its face adjacent the said casing disposed in a continuous plane, means interposed between said rear wall and the said thrust member for engaging the said face to move the thrust member longitudinally of the casing to establish frictional engagement between the elements, and means movable angularly of the casing for shifting said moving means longitudinally of the casing and angularly with respect to the said thrust member to adjust the parts of the clutch to compensate for wear.

4. In a friction clutch the combination of a driving element, a driven element, a casing fixed to one element and embracing the other element, a thrust ring mounted within and rotatable with said casing, a member mounted within said casing adjacent the rear wall thereof, a bell crank carried by the said member and adapted to move the said thrust ring to establish frictional engagement between the elements, the adjacent faces of said member and said rear wall being correspondingly inclined to move the said ring and bell crank longitudinally of the casing upon relative angular movement of said member and casing to adjust the parts of the clutch to compensate for wear, and means for moving said member angularly relatively to the said casing.

5. In a friction clutch, the combination of a driving element, a driven element, a casing fixed to one element and embracing the other element and having a recess in its rear wall provided with an inclined base, a thrust ring mounted within said casing, a member provided with a stud adapted to seat in and engage the inclined base of said recess, a bell-crank carried by the said member adapted to move the said thrust ring longitudinally of the casing to establish frictional engagement between the elements, and means for moving said member angularly of the casing to slide the said stud over the inclined base of the recess to move the bell crank longitudinally of the casing to adjust the parts of the clutch to compensate for wear.

6. In a friction clutch, the combination of a driving element, a driven element, a casing fixed to one element and embracing the other element and having a recess provided with an inclined base in the inner face of its rear wall and having an arcuate slot disposed through said rear wall, a thrust ring mounted within and rotatable with said casing, a member having a shoulder adapted to seat in said recess, a bell crank carried by the said member and adapted to move the thrust ring to establish frictional engagement between the elements, and a bolt fastened to the said member and protruding through the said slot and adapted to move lengthwise of the slot to move the said member longitudinally of the casing to adjust the parts of the clutch to compensate for wear.

GEO. W. BORG.

Witnesses:
C. W. BORG,
A. W. ALLISON.